United States Patent [19]
Tippett

[11] Patent Number: 6,026,605
[45] Date of Patent: Feb. 22, 2000

[54] SWITCH PLATE PICTURE FRAME ASSEMBLY

[76] Inventor: Nancy J. Tippett, 1524 Leslie Rd., Baltimore, Md. 21222

[21] Appl. No.: 09/179,906

[22] Filed: Oct. 28, 1998

[51] Int. Cl.⁷ .................................................. A47G 1/06
[52] U.S. Cl. ............................... 40/725; 174/66; 220/241
[58] Field of Search ................... 40/725; 174/66, 174/67; 220/241, 242

[56] References Cited

U.S. PATENT DOCUMENTS

| | | |
|---|---|---|
| D. 307,538 | 5/1990 | Tyree . |
| D. 308,814 | 6/1990 | Kintigos et al. . |
| 1,930,610 | 10/1933 | Despard . |
| 2,289,198 | 7/1942 | Jordan . |
| 2,515,820 | 7/1950 | Clark . |
| 3,953,933 | 5/1976 | Goldstein . |
| 4,339,045 | 7/1982 | Bodin . |
| 4,425,725 | 1/1984 | Moustakas et al. . |
| 4,565,023 | 1/1986 | Carlisle . |
| 4,707,564 | 11/1987 | Gonzales . |
| 4,780,573 | 10/1988 | Own . |
| 5,153,816 | 10/1992 | Griffin .................................... 174/66 X |
| 5,212,899 | 5/1993 | Fandreyer . |
| 5,675,125 | 10/1997 | Hollinger . |
| 5,811,729 | 9/1998 | Rintz ......................................... 174/66 |

*Primary Examiner*—Brian K. Green
*Assistant Examiner*—William L. Miller
*Attorney, Agent, or Firm*—Rosenberg, Klein & Lee

[57] ABSTRACT

A switch plate picture frame assembly (5) for mounting to a wall switch provided in a wall, comprising a frame member (9) adapted to be mounted to the wall switch with a back surface (10) of the frame member facing the wall and the wall switch, the frame member including a switch cover portion (8) for covering the wall switch, and a display portion (6) disposed adjacent the switch cover portion. The display portion includes a recessed inner ledge (12) defining a display opening through the frame member, a recessed outer ledge (14) partially surrounding the recessed inner ledge, a substantially planar retaining member (24) removably secured to the recessed outer ledge, a substantially planar light-transmissive member (32) removably disposed within display opening, and a planar indicia bearing member (30) removably disposed within a pocket formed by the retaining member, the light-transmissive member, and the recessed inner and outer ledges.

10 Claims, 5 Drawing Sheets

SWITCH PLATE PICTURE FRAME ASSEMBLY

BACKGROUND OF THE INVENTION

1. Field of the Invention

The present invention is directed to a display system. More particularly, the present invention is directed to a switch plate picture frame assembly adapted to be mounted to a wall switch for the purpose of covering the wall switch and for providing a display proximate and adjacent the wall switch. The present invention further directs itself to a switch plate picture frame assembly that facilitates convenient removal and replacement of an indicia bearing member and a protective cover member retained by the assembly.

2. Prior Art

Wall switch and outlet covers capable of displaying a variety of photographic or decorative indicia when assembled and mounted in place are well known in the prior art. U.S. Pat. No. 4,425,725, directed to a combination switch plate and photograph holder, exemplifies the prior art display systems wherein replacement of either the indicia bearing member, such as a photograph or the like, or replacement of the protective cover therefor, requires the partial disassembly of the structural elements that comprise the overall display system. For instance, in the '725 Patent, replacement of photograph 14 requires the prior removal of specially adapted photograph holder plastic cover 18 which is frictionally secured to base 20 of the display system. Further, should plastic cover 18 become damaged, scratched or marred through use, it must be replaced with an equivalent, specially adapted plastic cover which may or may not be commercially available at the time replacement thereof is required. Both of these foregoing situations present inconvenience to the user of the displayed device. These inconveniences and disadvantages are similarly attendant to the display systems described in U.S. Pat. Nos. 5,675,125, 3,953,933, 2,515,820 and 5,212,899.

Design Pats. 308,814 and 307,538 depict decorative or informative display members removably positioned over wall mounted electrical outlets. Since the depicted display members cover the outlet, use of the outlet requires re-positioning or removal of the display member so that the outlet can be readily accessed. Further, neither of the patents teaches a protective covering for the removable display member which is thus subjected to facial damage thereof.

SUMMARY OF THE INVENTION

In view of the aforementioned shortcomings of the prior art systems, an object of the present invention is to provide a new and improved switch plate picture frame assembly.

Another object of the present invention is to provide a switch plate picture frame adapted to display any desired indicia, including photographic, written, decorative or the like, provided on the surface of an indicia bearing member, in proximity to a wall switch provided in a wall.

A further object of the present invention is to provide a switch plate picture frame assembly wherein the user can easily and conveniently access the indicia bearing member for quick removal and replacement thereof.

An even further object of the present invention is to provide a switch plate picture frame assembly wherein the user can remove and replace both the indicia bearing member and a protective, light-transmissive member therefor without having to remove any structural components of the picture frame assembly or without having to resort to the use of special tools or implements to effect such removal and replacement.

The switch plate picture frame assembly of the present invention comprises a frame member adapted to be mounted to the wall switch with the back surface of the frame member facing the wall and the wall switch. The frame member includes a switch cover portion for covering the wall switch, the switch cover portion having an actuator opening and a fastener opening therein corresponding respectively to the actuator of the wall switch and a fastener for securing the frame member to the wall switch. The frame member further includes a display portion disposed adjacent to, such as above, the switch cover portion. The display portion includes a recessed inner ledge formed in the back surface of the frame member, which defines a display opening through the frame member. A recessed outer ledge partially surrounds the recessed inner ledge and is offset therefrom in a direction toward the back surface of the frame member. A substantially planar retaining member is further provided, and has a periphery thereof removably secured against the recessed outer ledge. A substantially planar light-transmissive member is removably disposed within the display opening and a peripheral edge of the light-transmissive member is provided in overlapping and abutting relation with the recessed inner ledge. A substantially planar indicia bearing member is removably disposed within a pocket formed by the retaining member, the light-transmissive member and the stepped ledge structure formed by the inner and outer recessed ledges.

DETAILED DESCRIPTION OF THE PREFERRED EMBODIMENT

Figure 1:
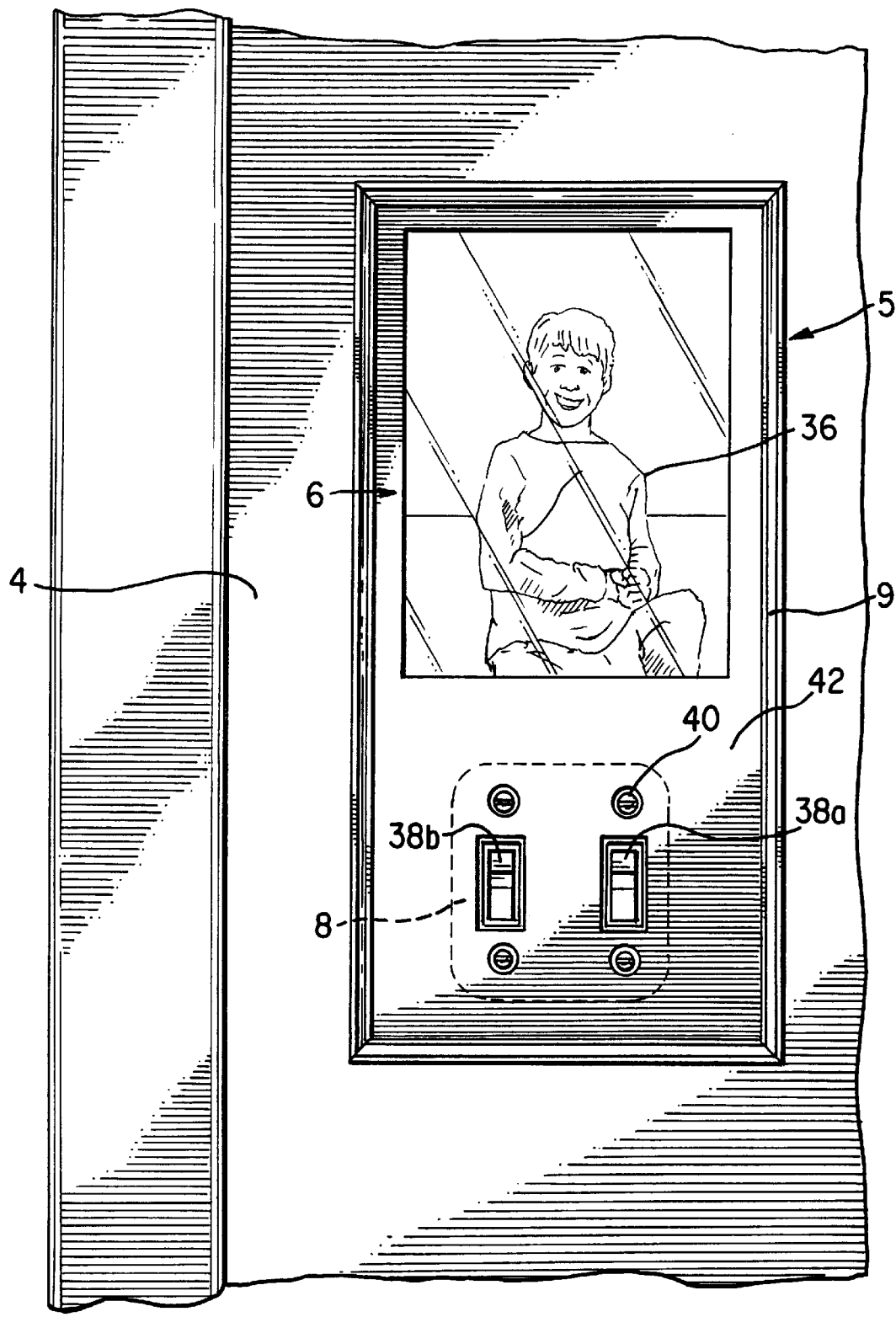
FIG. 1 is a perspective front view of a first embodiment of the present invention, shown mounted to a wall switch.

Referring to FIG. 1, in a first embodiment of the present invention, switch plate picture frame assembly 5 is mounted to a wall switch and is displaying a decorative FIG. 36 retained by the assembly. In FIG. 1, the wall switch to which the assembly is mounted resides in wall 4, but is hidden from view behind switch plate or cover portion 8 of assembly 5. The wall switch can be any of a number of commercially available wall switches not important to the inventive concept herein described, with the exception that it includes: a fastening mechanism, such as a threaded through-hole for threadingly engaging a complimentary threaded fastener, such as a screw, as is known in the art for fastening a switch plate or cover to the wall switch; and, a switch actuator for actuating the wall switch, as is equally well known.

In FIG. 1, four such fastening screws 40 fasten or mount assembly 5 to the wall switch hidden therebehind and a pair of wall switch actuators 38*a*, 38*b* extend through switch plate portion 8, as they would extend through conventional switch plates, so that a user can actuate the wall switch. In addition to switch plate portion 8, assembly 5 includes display portion 6 for displaying exemplary FIG. 36 when assembly 5 is mounted to the wall switch.

Figure 2:
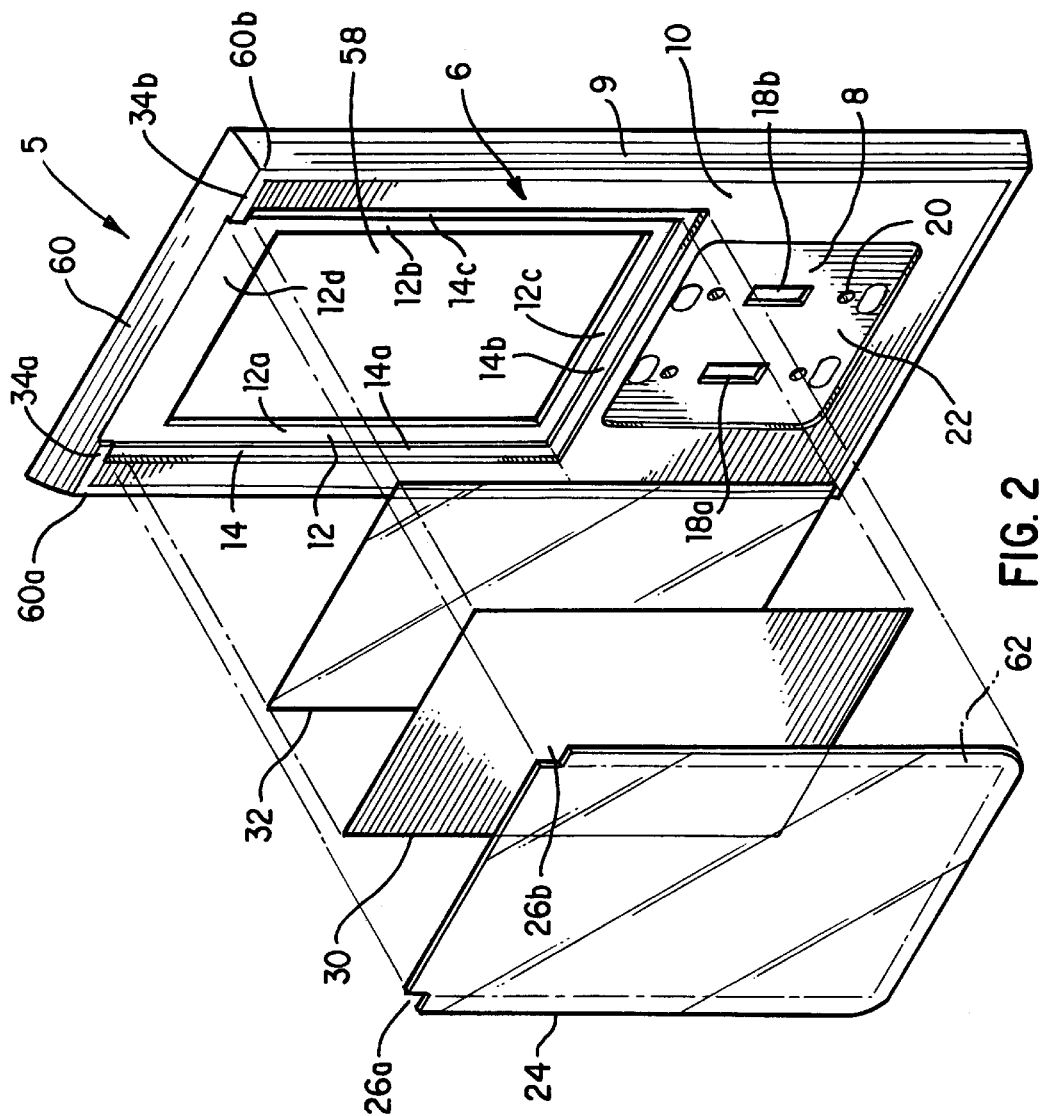
FIG. 2 is an exploded or disassembled perspective back view of the embodiment of FIG. 1.

Whereas FIG. 1 illustrates the front or exposed side of assembly 5 when assembly 5 is mounted to the wall, FIG. 2 illustrates the back or hidden side of assembly 5 facing the wall switch and wall surface when assembly 5 is mounted to the wall switch. FIG. 2 further illustrates display portion 6 in its disassembled state, as viewed from this back or hidden side of assembly 5. In FIG. 2, assembly 5 includes substantially planar frame member 9 which serves as the primary structural member of assembly 5. Frame member 9, which encompasses both display portion 6 and switch plate portion 8, can be made from any suitably resilient material, including but not being limited to, plastic, metal, wood, simulated wood, such as press board, rubber, or any combination of the foregoing structural materials. Further, frame member 9 can be a unitary, integrally formed structural member, or alternatively, frame member 9 can be pieced together in order to form the illustrated structure. Frame member 9 can be solid throughout, or alternatively, formed with internal voids or hollow portions therein.

Figure 6:
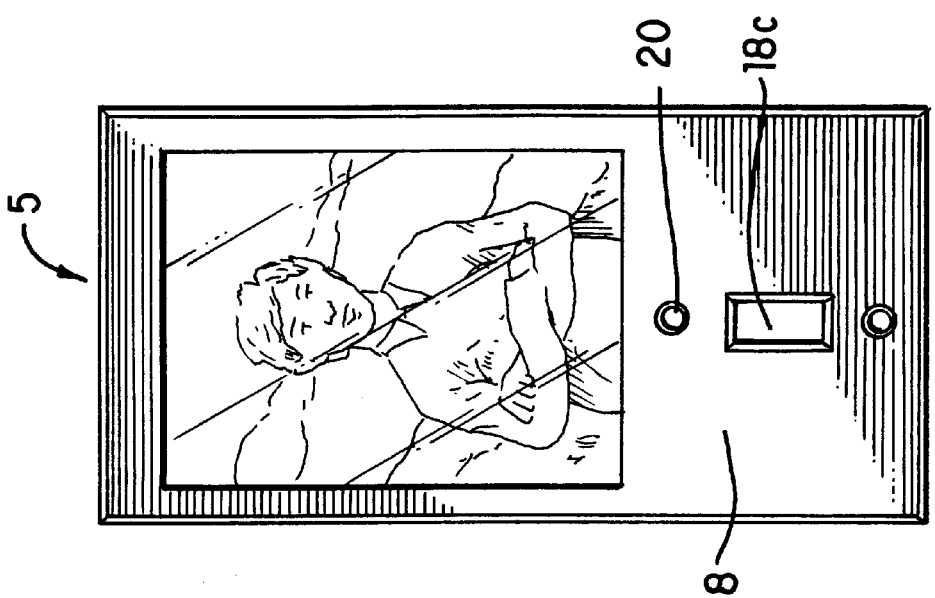

Switch plate portion 8 is formed as a substantially square recess 22 in back surface 10 of frame member 9. The recess has height (vertical) and width (horizontal) dimensions commensurate with the corresponding dimensions of the wall switch to which assembly 5 is to be mounted so that switch plate portion 8 encompasses or covers the wall switch, in a manner similar to any conventional switch plate. Switch plate portion 8 has a pair of actuator openings 18a, 18b formed therein corresponding to wall switch actuators 38a, 38b, shown in FIG. 1. Any number of such actuator openings can be provided in accordance with any number of wall switch actuators of the wall switch. Further, switch plate portion 8 has one or more fastener openings 20 therein which correspond to the fasteners 40 (FIG. 1) used to secure assembly 5 to the wall switch. The fastener openings, like the actuator openings, are provided in the appropriate numbers and positions as are required by the wall switch. For instance, in the alternative embodiment of FIG. 6, in picture frame assembly 5, a single actuator opening 18c, and a single pair of fastener openings 20 are provided in switch plate portion 8.

Display portion 6 of assembly 5, disposed vertically adjacent switch plate portion 8, comprises a pair of stepped, recessed ledges 12, 14 also formed in back surface 10 of frame member 9. Recessed inner ledge 12 defines a perimeter boundary for a display opening 58 through frame member 9. In the embodiment shown, vertically disposed inner ledge segments 12a, 12b and horizontally disposed inner ledge segments 12c, 12d define the perimeter of a rectangularly shaped display opening. However, recessed inner ledge 12 can define other display opening shapes so long as the shape so defined facilitates operation of the structure in the present invention as a display device, as later described. Further, the dimensions of the display opening, for instance, vertical-height and horizontalwidth, can be varied in accordance with the particular application of the display assembly.

Partially surrounding recessed inner ledge 12 and offset therefrom in a direction extending toward back surface 10 is recessed outer ledge 14. Essentially, recessed outer ledge 14 includes outer ledge segments 14a, 14c and 14b surrounding respective inner ledge segments 12a, 12c and 12b. For reasons that will become apparent later in this description, no outer ledge segment is provided in correspondence with horizontally directed upper ledge segment 12d of recessed inner ledge 12. Further, vertically disposed outer ledge segments 14a, 14c are terminated at upper ends thereof by a respective pair of oppositely disposed stopping members or projections 34a, 34b. Stopping members 34a, 34b extend from respective top edges 60a, 60b of frame member 9 toward the opposing stopping member.

In addition to the recessed ledges and display opening described above, display portion 6 further includes substantially planar members 32, 30 and 24, illustrated in FIG. 2 prior to the assembly of display portion 6. The broken lines in FIG. 2 illustrate the dimensioning and alignment of these three planar members with respect to the recessed ledges and stopping members described above. Substantially planar retaining member 24 is dimensioned to extend across the display opening with a peripheral edge 62 thereof (See FIGS. 2 and 3) overlapping a surface of recessed outer ledge 14. A pair of opposing corner notches 26a, 26b are provided in the upper edge of retaining member 24. The notches conform both positionally and dimensionally to the respective pairs of stopping members 34a, 34b as shown.

In the assembly of display portion 6 substantially planar retaining member 24 is removably secured to or against frame member 9 with peripheral edge 62 of retaining member 24 in overlapping and abutting relation with recessed outer ledge 14. Any suitable means for removably, or even fixedly, securing retaining member 24 to frame member 9 can be used, including the use of an adhesive between the surface of recessed outer ledge 14 and peripheral edge 62 of retaining member 24, or simply by taping retaining member 24 in place. Retaining member 24 can be transparent, translucent or opaque and can be made from plastic, wood, metal, glass, cardboard or any other material capable of being secured to frame member 9, so long as the retaining member is suitably resilient.

In addition to retaining member 24, display portion 6 further includes substantially planar members 30 and 32. As illustrated in FIG. 2, substantially planar transparent or translucent member 32 is dimensioned to extend across the display opening so that a peripheral edge thereof is provided in overlapping, and when assembled, abutting relation with a surface of recessed inner ledge 12. Unlike retaining member 24 which is removably secured to frame member 9, light-transmissive member 32 is removably disposed within the display opening so that it can be readily removed therefrom and replaced when necessary. Planar member 32, which protects a forward facing indicia bearing surface of planar member 30, can be made from plastic, glass, or any other suitably light-transmissive material.

Figure 3:
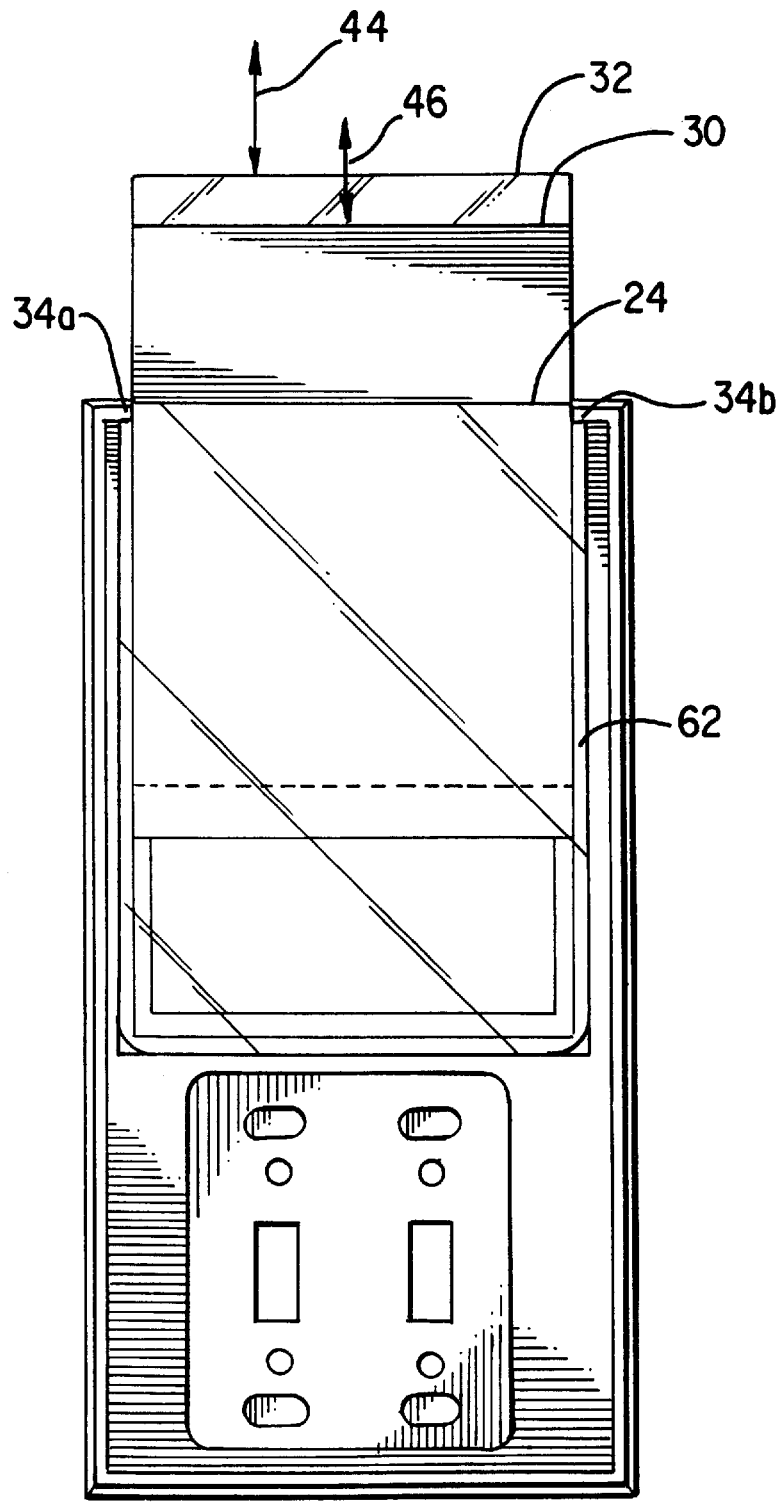
FIG. 3 is a perspective back view of the embodiment of FIG. 1, showing removal and/or replacement of removable, planar display members retained by the assembly of the present invention.

When display portion 6 is assembled, namely, when retaining member 24 is secured in place against recessed outer ledge 14, and when transparent member 32 is disposed within the display opening, substantially planar indicia bearing member 30 is removably disposed within a pocket formed between retaining member 24, transparent member 32 and the stepped ledge structure formed by ledges 12 and 14, as shown in FIG. 3. Upon the display surface of indicia bearing member 30, namely, the front surface thereof, is any desired indicia including but not being limited to decorative printing, photographic images, embossed indicia, etc.

As previously described, both transparent member 32 and indicia bearing member 30 are removably disposed within the display opening. The structure of the present invention facilitates quick and easy removal and replacement of these members while concurrently enhancing the structural integrity of the switch plate picture frame assembly. Referring to FIGS. 2 and 3, with retaining member 24 secured in place against outer ledge 14 of frame member 9, horizontally directed upper ledge segment 12d of inner ledge 12 and an opposing upper peripheral edge of retaining member 24 (extending between the corner notches of the retaining member) define an access slot or gap therebetween through which the indicia bearing member and light-transmissive member can be removably positioned within the display opening. Referring to FIG. 3, the bi-directional arrows 44 and 46 depict respective displacement through this access slot of transparent member 32 and indicia bearing member 46 during their removal from and insertion into the aforementioned pocket in display portion 6. Thus, the use and maintenance of the display assembly of the present invention is convenient for any user thereof, since removal and replacement of planar members 30 and 32 requires merely their respective displacements through the access slot provided at the upper end or top of the display portion pocket, and since no further manipulative steps nor any tools are required to disassemble or dismount the display assembly in order to effect this removal or replacement.

Referring to FIG. 3, as either of the removable planar members are withdrawn from their resting positions within the pocket of display portion 6, it is possible that undesired forces, particularly upwardly directed forces, resulting from this withdrawal will be exerted on retaining member 24, thus tending to undesirably separate the retaining member from its secured position. However, under such circumstances, the structure of the present invention advantageously provides stopping members 34a, 34b which engage the respective pair of corner notches 26a, 26b formed in retaining member 24, thereby preventing upward displacement of retaining member 24 under the influence of the upwardly directed forces. This inter-cooperation between the projecting members and the corner notches thus serves to advantageously further secure the retaining member in place against the frame member.

Figure 5:
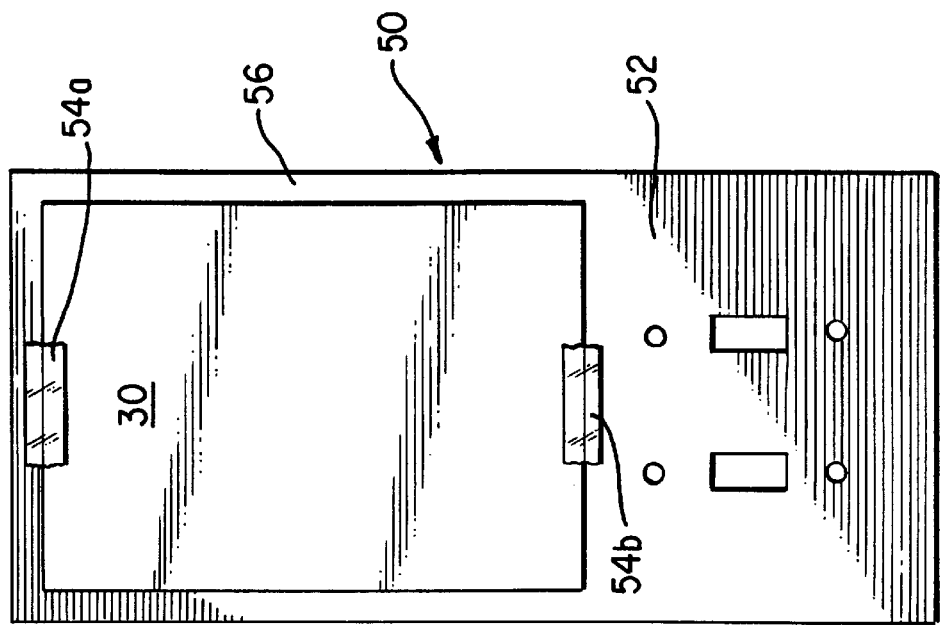
FIG. 4 and FIG. 5 are respectively, perspective front and back views of a second embodiment of the present assembly; and, FIG. 6 is a perspective front view of another embodiment of the present invention.
Figure 4:
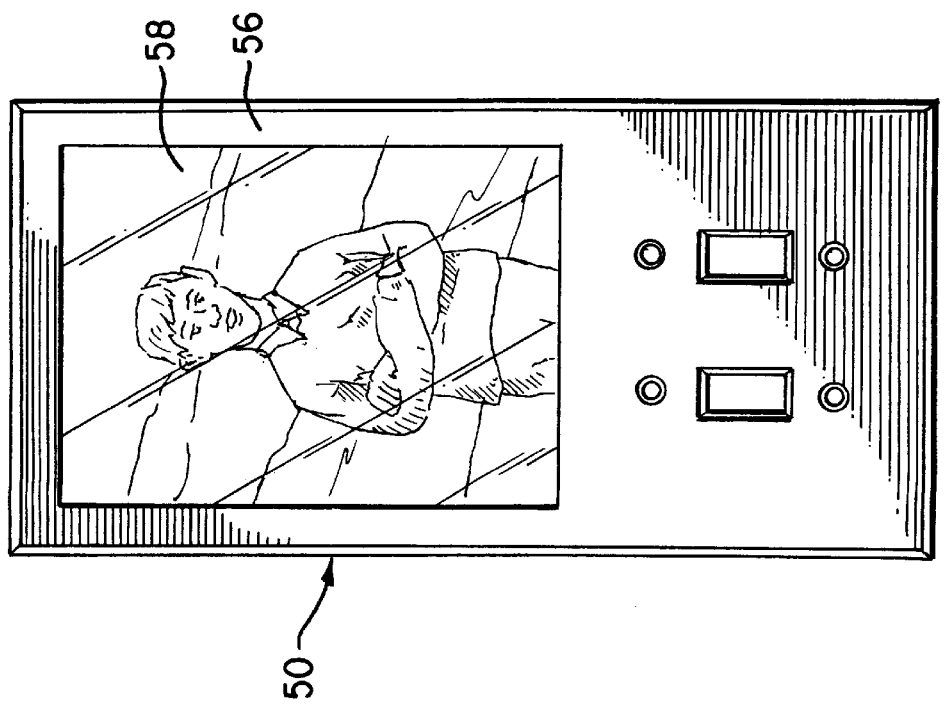

Referring to FIGS. 4 and 5, in a second embodiment of the present invention, switch plate picture frame assembly 50 has a front or visible side (FIG. 4) that is substantially equivalent to that illustrated in the first embodiment of the present invention (FIG. 1). Particularly, a substantially rectangular picture frame 56 defines display opening 58 therein through which indicia is visibly displayed. Referring to FIG. 5, the back or hidden side of the picture frame assembly in this second embodiment deviates from the back side or hidden side of the assembly in the first embodiment (FIG. 2) in the following ways. First, as illustrated in FIG. 5, the switch plate or cover portion in the second embodiment in substantially planar and thus does not include a switch plate recess therein. Second, the back surface of picture frame 56 does not include any recessed ledges therein nor any other pocket-forming elements or structure. In use, indicia bearing member 30 is removably secured, as shown, to the back surface of picture frame 56 with the indicia bearing surface thereof visibly displayed through display opening 58. Indicia bearing member 30 is removably secured to the back surface of picture frame 56 with tape segments 54a, 54b, adhesive, or any other suitable fastening mechanism. The second embodiment of the present invention thus provides a simple but effective structure for displaying a picture or the like adjacent a wall switch.

In the figures of the previously described embodiments, the single display portion is positioned both vertically adjacent to and in vertical alignment with switch plate portion 8. Alternative embodiments of the present invention include any variety of relative positional arrangements between the display portion and the switch plate portion. For instance, a plurality of separate and distinct display portions can be provided within the frame member. Additionally, the display portion need not be positioned directly above the switch cover. Rather, any number of display portions can occupy any number of positions surrounding the wall switch and the switch plate portion, including, for example, a position horizontally adjacent to, or along side, the switch plate portion. Further, the access slot provided at the upper end or top side of the display portion, through which the planar members are removably positioned within the display portion, can alternatively be provided at the side of the display pocket. Such would facilitate side, rather than top, removal and insertion of the planar members.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of structural elements may be reversed or interposed, all without departing from the spirit or scope of the invention as defined in the appended claims.

What is claimed is:

1. A switch plate picture frame assembly for mounting to a wall switch provided in a wall, comprising:
   a frame member adapted to be mounted to the wall switch with a back surface of said frame member being positioned for facing a portion of the wall and the wall switch, said frame member including
   a switch cover portion for covering the wall switch, said switch cover portion having an actuator opening and a fastener opening formed therein for respectively receiving a switch actuator of the wall switch therein and for securing said frame member to the wall switch with a fastener;
   a display portion disposed adjacent said switch cover portion, said display portion including
      a recessed stepped-ledge structure formed in said back surface of said frame member and defining a perimeter boundary for a display opening through said frame member;
      a substantially planar retaining member having a periphery thereof removably secured against said recessed stepped-ledge structure;
      a substantially planar light-transmissive member removably disposed within said display opening; and,
      a substantially planar indicia bearing member removably disposed within a pocket formed by said retaining member, said light-transmissive member and said recessed stepped-ledge structure.

2. The assembly as recited in claim 1 wherein said recessed stepped-ledge structure includes
   a recessed inner ledge formed in said back surface of said frame member and defining said display opening through said frame member; and,
   a recessed outer ledge partially surrounding said recessed inner ledge and offset therefrom in a direction toward said back surface of said frame member.

3. The assembly as recited in claim 2 wherein said periphery of said planar retaining member is removably secured against said recessed outer ledge.

4. The assembly as recited in claim 3 wherein a peripheral edge of said light-transmissive planar member is provided in overlapping and abutting relation with said recessed inner ledge.

5. The assembly as recited in claim 4 wherein a horizontally directed upper ledge segment of said recessed inner ledge and an upper peripheral edge of said retaining member define an access slot therebetween through which said indicia bearing member and said light-transmissive member are removably positioned within said display opening.

6. The assembly as recited in claim 5 further including a pair of oppositely disposed stopping members, each said stopping member extending from a top edge of said frame member toward the opposing stopping member, said upper peripheral edge of said retaining member having a pair of corner notches for respectively engaging said pair of stopping members, thereby further securing said retaining member to said frame member.

7. The assembly as recited in claim 6, wherein said display opening is positioned above the wall switch when said frame member is secured thereto.

8. The assembly as recited in claim 7 wherein said inner ledge defines a substantially rectangular display boundary.

9. The assembly as recited in claim 1 wherein said switch cover portion further includes a recess formed in said back surface of said frame member and dimensioned to encompass the wall switch when said frame member is secured thereto.

10. The assembly as recited in claim 1 wherein said switch cover portion and said display portion are integrally formed with said frame member.

\* \* \* \* \*